United States Patent [19]
Cake

[11] 3,935,470
[45] Jan. 27, 1976

[54] MULTIPLEXED SIGNAL-SEQUENCE CONTROL SYSTEM

[75] Inventor: Arthur F. Cake, Smithtown, N.Y.

[73] Assignee: Wagner Electric Corporation, Parsippany, N.J.

[22] Filed: Aug. 7, 1974

[21] Appl. No.: 495,436

[52] U.S. Cl............ 307/105 B; 340/52 E; 340/278; 180/82 C
[51] Int. Cl.² ........................................ B60R 21/10
[58] Field of Search ....... 307/105 B; 340/52 E, 278; 180/82 C

[56] References Cited
UNITED STATES PATENTS
3,742,448   6/1973   Motz .............................. 307/105 B

*Primary Examiner*—Herman J. Hohauser
*Attorney, Agent, or Firm*—Eyre, Mann & Lucas

[57] ABSTRACT

Circuitry operative to monitor input signals indicative of seat occupancy and seat belt usage from each of four different stations with a single, multiplexed detection circuit coupled through gating circuits to four antennae, each of which is associated with a particular station. A seat belt monitor circuit receives signals indicating seat belt usage produced by a seat belt switch associated with a particular station. Another monitor circuit receives the output of the detection circuit indicating seat occupancy and the output of the seat belt monitoring circuit indicating seat belt usage and processes this information to provide a warning control signal in response to either (1) one or more signals indicating only seat occupancy or only seat belt usage, or (2) unrelated signals indicating seat occupancy and seat belt usage, or (3) related signals indicating seat occupancy and seat belt usage but occuring in an improper sequence. The system is energized only upon receiving a signal indicating seat belt usage, or activation of the ignition switch in an attempt to start the vehicle or use auxiliary vehicle power. In order to determine whether or not a seat has been occupied before the system has been fully energized, a delay signal is provided which delays complete processing of the seat belt information until the seat occupancy information has first been processed.

20 Claims, 3 Drawing Figures

MULTIPLEXED SIGNAL-SEQUENCE CONTROL SYSTEM

CROSS-REFERENCES TO RELATED APPLICATIONS

The present invention represents a significant advance over the invention disclosed and claimed in U.S. Pat. No. 3,798,551 entitled MULTIPLEXED SIGNAL-SEQUENCE CONTROL SYSTEM issued on Mar. 19, 1974 upon application Ser. No. 289,573 filed on Sept. 15, 1973 in the name of Arthur F. Cake. The sensing circuit employed in the present system is disclosed and claimed in U.S. Pat. No. 3,801,799 entitled CAPACITANCE AND RESISTANCE-RESPONSIVE CONTROL CIRCUITS issued on Apr. 2, 1974 upon application Ser. No. 280,219 filed on Aug. 14, 1972 in the name of Carl E. Atkins. The present invention may also advantageously employ the antenna system disclosed and claimed in U.S. Pat. No. 3,740,567 entitled HIGH-DISCRIMINATION ANTENNA ARRAY FOR CAPACITANCE-RESPONSIVE CIRCUITS issued on June 19, 1973 upon application Ser. No. 245,799 filed on Apr. 20, 1972 in the name of Carl E. Atkins. Also, the present invention may be advantageously employed to control a warning circuit of the type disclosed and claimed in U.S. Pat. No. 3,803,515 entitled ELECTRONIC FLASHER CIRCUITS issued on Apr. 9, 1974 upon application Ser. No. 255,155 filed on May 19, 1972 in the name of Paul A. Carlson. The disclosures of each of the aforementioned patents are incorporated herein by reference.

BACKGROUND OF THE INVENTION

In recent years, various systems and devices have been employed in automotive vehicles to provide a warning signal whenever any occupant of the vehicle has not fastened his or her safety belt prior to operation of the vehicle. Such systems have incorporated mechanical switches under the fundament-supporting portions of the vehicle seats to detect the presence of an occupant, or in association with the seat belt so that the switch is actuated upon pulling one portion of the seat belt out of its enclosure (reel switch) or upon latching the seat belt buckle (buckle switch) to detect seat belt usage. Mechanically-variable capacitances have also been used as the means for detecting seat occupancy.

In practice, it has been found that mechanical devices for sensing seat occupancy have produced a warning signal when none should be given because these devices are all pressure-operated. Thus, when a package or pet animal is resting on the seat adjacent the driver, the system responds to the weight exerted by such non-human seat occupant and generates a signal to indicate that the seat belt buckle should be fastened. This problem has been overcome by employing capacitance-responsive systems and antenna arrays with discrimination capability as disclosed and claimed in the cross-referenced applications. However, there remains the problem of reducing the number and complexity of the signal processing circuitry for handling the occupancy and seat belt buckle condition signals from each seat. Toward this end, applicant has designed a system employing only a single seat occupancy detection circuit and which processes the signals of both first and second classes (i.e., signals indicating seat occupancy and seat belt usage, respectively) from each of four seat locations. The system disclosed herein affords the further advantage of essentially zero standby power consumption, which is an important feature in automotive applications.

SUMMARY OF THE INVENTION

The present invention is embodied in and carried out by an electronic system operative to receive signals of both a first and a second class from each of a plurality of stations, and to generate an output signal in response to either one or more signals of only the first class or only the second class, or (2) unrelated signals of both the first and second classes, or (3) related signals of both the first and second classes occurring in an improper sequence. The system is fully energized only upon receiving a signal of the second class or by actuation of an associated auxiliary circuit, with a delay signal being provided to delay complete processing of the signals of the second class until signals of the first class have been processed.

BRIEF DESCRIPTION OF THE DRAWING

The present invention will be more readily understood if the written description thereof is read in the light of the drawing, of which.

DESCRIPTION OF THE PREFERRED EMBODIMENT

Figure 1:
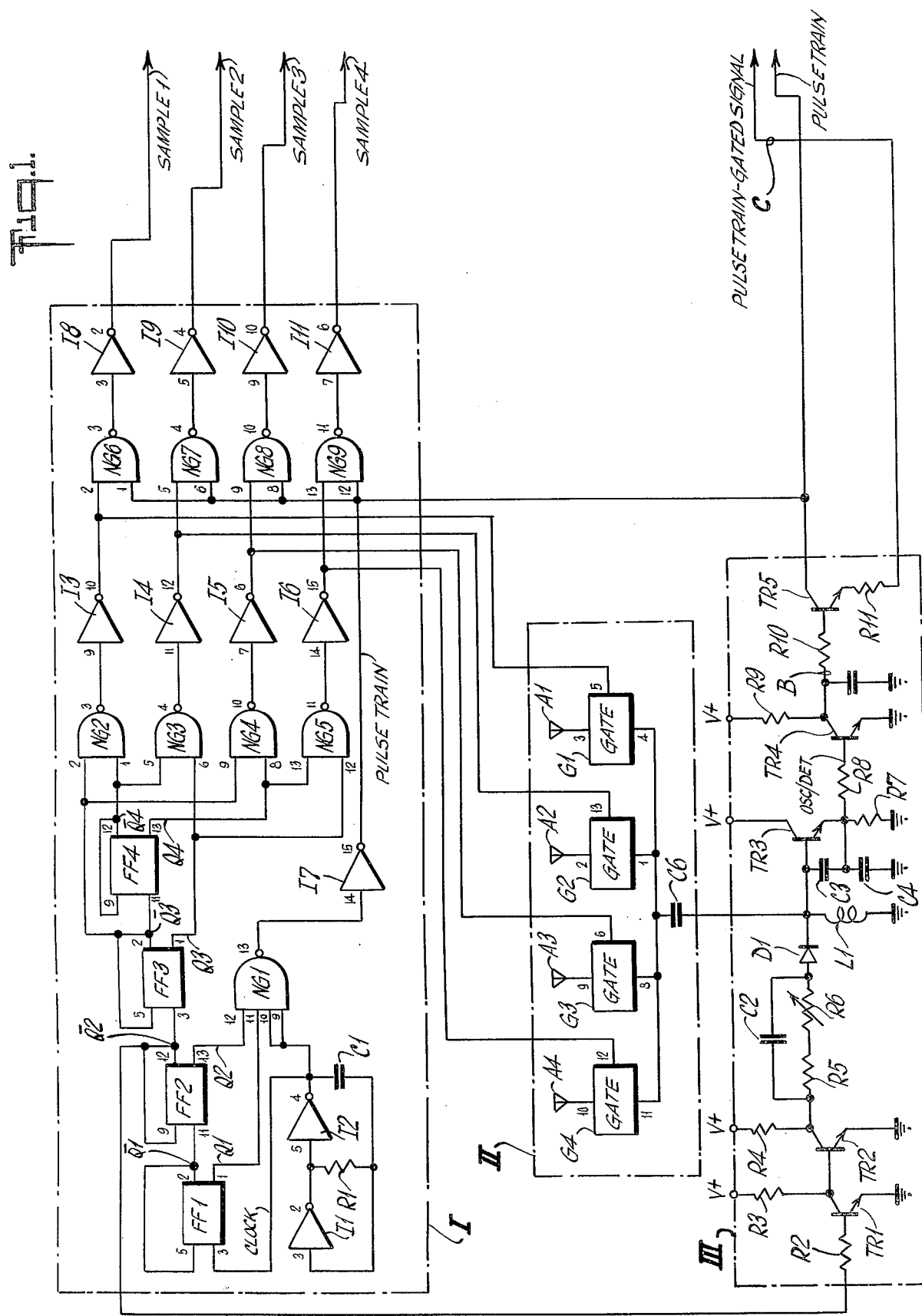
FIGS. 1 and 2 are circuit diagrams of first and second portions of the complete electronic system which is the preferred embodiment of the present invention.
Figure 2:
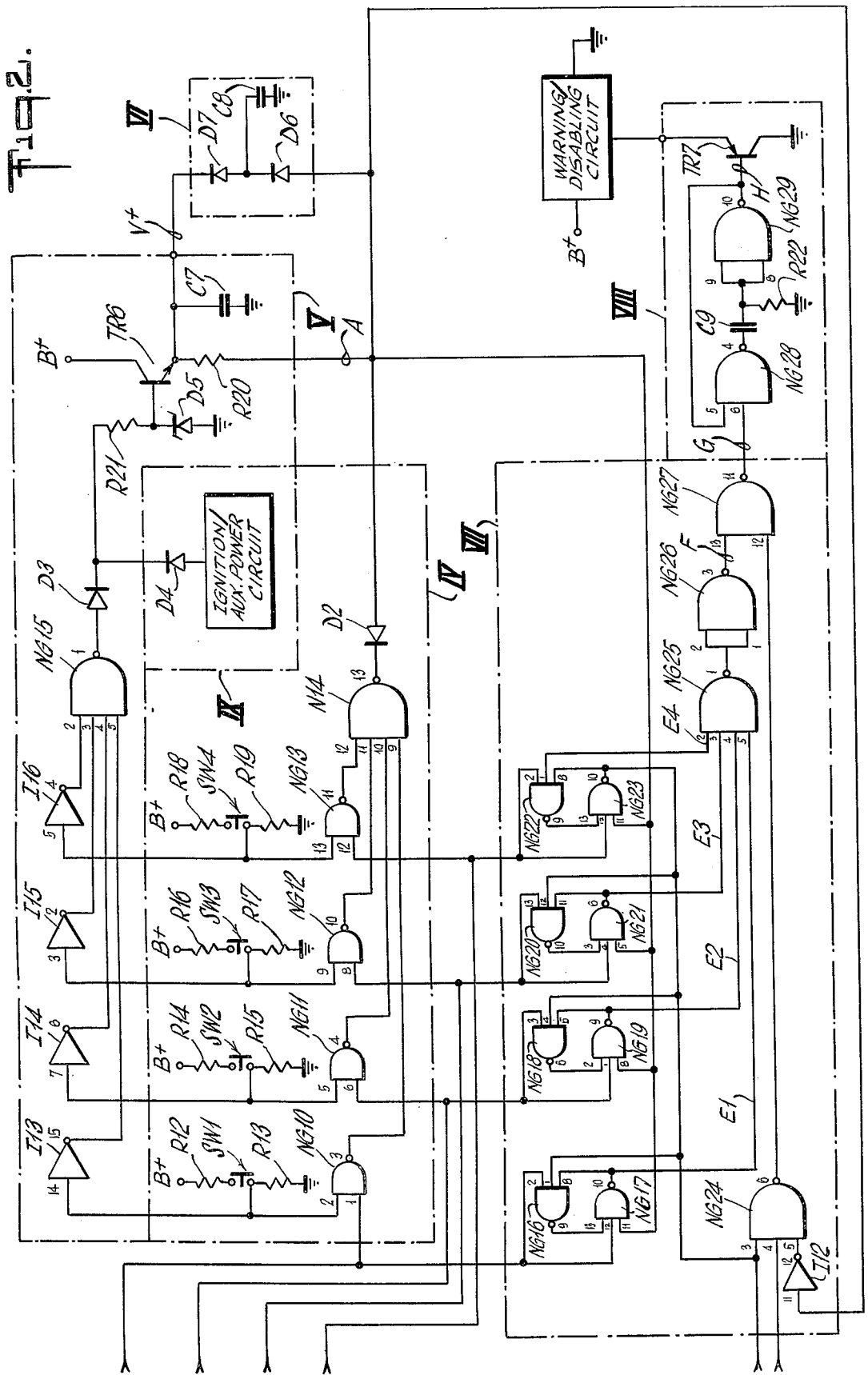

Referring now to the complete electronic system as shown in combined FIGS. 1 and 2, the system comprises a number of functionally discrete sub-circuits, viz., timing circuit I, gating circuit II for signals of the first class, detection circuit III for signals of the first class, monitoring circuit IV for signals of the second class, power supply circuit V, delay circuit VI, monitoring circuit VII for signals of the first and second classes, and drive circuit VIII for actuating either a warning device, or a device for preventing operation of the vehicle, or both. The four seat locations, or stations, have been numbered for ease of identification and association of related signals. For example, switch SW1 corresponds to station 1, as does GATE 1, etc.

In timing circuit I, inverters I1 and I2 combined with resistance R1 and capacitance C1 form a high-frequency (preferably 40 hilohertz) square wave generator, the output of which constitutes the clock signal shown in FIG. 3a. This clock signal is fed to pins 9 and 10 of NAND gate NG1 and to pin 3 of flip-flop FF1, the latter being operative to generate complementary outputs at one-half the frequency of the input pulses. The Q1 output appearing at pin 1 of FF1 (FIG. 3b) is fed to pin 11 of NG1, and the $\overline{Q1}$ output appearing at pin 2 of FF1 (FIG. 3c) is applied to input pin 11 of FF2. In response to this input, FF2 generates a pair of complementary outputs having one-half the frequency of the input, i.e., one-fourth the frequency of the clock signal. The Q2 output appearing at pin 13 of FF2 (FIG. 3d) is applied to pin 12 of NG1, and the $\overline{Q2}$ output appearing at pin 12 of FF2 (FIG. 3e) is applied to input pin 3 of FF3 and to detection circuit III. In response to this input, FF3 generates a pair of complementary output signals of one-half the frequency of the clock signal.

The Q3 output appearing at pin 1 of FF3 (FIG. 3f) is applied to input pin 6 of NG3 and input 12 of NG5, and the $\overline{Q3}$ output appearing at pin 2 of FF3 (FIG. 3g) is applied to input pin 11 of FF4, input pin 2 of NG2, and input pin 9 of NG4. In response to this input, FF4 generates a pair of complementary outputs of one-half the frequency of the input, i.e., one-sixteenth the frequency of the clock signal. The Q4 output appearing at pin 13 of FF4 (FIG. 3h) is applied to input pin 8 of NG4 and input pin 13 of NG5, and the $\overline{Q4}$ output appearing at pin 12 of FF4 (FIG. 3i) is applied to input pin 1 of NG2 and input pin 5 of NG3. In response to these various inputs, NG2 generates a signal which is inverted by I3 to form the gate signal shown in FIG. 3j fed into GATE 1, NG3 generates a signal which is inverted by I4 to form the gate signal shown in FIG. 3k fed into GATE 2, NG4 generates a signal which is inverted by I5 to form the gate signal shown in FIG. 3l fed into GATE 3, and NG5 generates a signal which is inverted by I6 to form the gate signal shown in FIG. 3m fed into GATE 4.

The gate signals GATE 1–4 of FIG. 3j–m are fed to gating circuit II as described above and to input pin 2 of NG6, input pin 5 of NG7, input pin 9 of NG8 and input pin 13 of NG9, respectively. The output of NG1 appears at pin 13 and is inverted by I7 to produce at pin 15 the pulse train of FIG. 3n, which is fed to input pin 1 of NG6, input pin 6 of NG7, input pin 8 of NG8, and input pin 12 of NG9, to the collector of TR5 in detection circuit III, and to input pin 4 of NG24 in monitoring circuit VII. The outputs of NAND gates NG6, NG7, NG8 and NG9 appearing at output pins 3, 4, 10 and 11, respectively, are inverted by inverters I8, I9, I10 and I11, respectively, the outputs of which are timing signals designated as Sample 1, Sample 2, Sample 3 and Sample 4 (FIG. 3 o, q, s, and u, respectively), and are fed to monitoring circuit IV and monitoring circuit VII. These timing signals are generated continuously, as power is continually supplied to all logic circuits in the system. This continuous supplying of power, or stand-by power, is necessary to ensure that the system is not defeated by an improper sequence of events which may otherwise go undetected. Therefore, stand-by power is only supplied to the logic circuits and selected components of the system in order to hold the stand-by power consumption to a minimum. The total instantaneous power consumption of the logic circuits is in the order of a few milliwatts and may be considered negligible for a parked automobile. The system itself becomes fully energized and operative only upon switching on transistor TR6 in power supply V. External power (B+) is supplied to the collector of transistor TR6 and is fed to detection circuit III as V+ through transistor TR6 when TR6 is rendered conductive. Stand-by power, in addition to being applied to the collector of transistor TR6 and the logic circuits, is also applied to resistors R12, R14, R16 and R18 in monitoring circuit IV. However, it should be noted that no power is consumed by these components so long as TR6 is non-conducting and seat belt switches SW1, SW2, SW3 and SW4 are in their normally-open positions as shown in FIG. 2. As will be discussed more fully hereinafter, transistor TR6 is turned on by the closing of one or more of seat belt switches SW1–SW4 or by the activation of the ignition-/auxiliary power circuit IX. Consequently, until the occurrence of one of these events, the system is essentially de-energized and in a stand-by condition.

Gate signals GATE 1 – GATE 4 are fed to control pins 5, 13, 6 and 12 of gates G1–G4, respectively. The output pins 4, 1, 8 and 11 of gates G1–G4, respectively, are connected together and to one terminal of capacitor C6. Antennae A1–A4 couple load impedances having capacitive and/or resistive components to the inputs of the respective gates G1–G4 which are sequentially gated on by the respective signals GATE 1 – GATE 4. As a result, the impedance coupled to any given antenna is also coupled to detection circuit III during the period of time in which a gate signal is applied to the gate associated with the given antenna. Hence, gating circuit II provides a single, time-sequenced output which is fed to detection circuit III through capacitor C6.

Detection circuit III operates as described in U.S. Pat. No. 3,801,799, the disclosure of which is incorporated herein by reference. Assuming power is being supplied to detection circuit III, i.e., V+ is applied to the power input terminals as shown in the drawing, and timing signal $\overline{Q2}$ is fed to the input of a buffer amplifier circuit in detection circuit III, the tank circuit L1, C3, C4 is energized through a bias circuit formed by diode D1, capacitor C2 and resistors R5 and R6 during positive portions of timing signal $\overline{Q2}$. Thus, the tank circuit is forced to oscillate or "ring" at its natural frequency during the interpulse nulls of timing signal $\overline{Q2}$. The tank circuit will oscillate freely and the oscillations will be unattenuated when no load is sensed by any of the antennae, indicating the absence of a human on any seat. When all seats are unoccupied the signal OSC/-DET (FIG. 3w) shows oscillations during each of the interpulse nulls of $\overline{Q2}$. Under these circumstances, detection circuit signal B will be identical to timing signal $\overline{Q2}$. When a load with a substantial resistive and/or capacitive component is coupled to any of antennae A1–A4, indicating occupancy of the associated seat, the "ringing" of the tank circuit will be substantially attenuated when the associated antenna is gate-coupled to the tank circuit. For example, if only the seat corresponding to station 1 were occupied by a human, the oscillations of the tank circuit would be attenuated only during the time that the GATE 1 signal is a logic high, and the OSC/DET signal would appear as shown in FIG. 3x. Signal B would then appear as shown in FIG. 3y. If V+ is not supplied to detection circuit III by power supply circuit V, then signal B will continuously be a logic low regardless of any other inputs to the de-energized detection circuit III. Signal B is fed to the base of transistor Q5 through resistor R10. The collector of transistor Q5 is connected to receive the pulse train output from inverter I7 in timing circuit I. As a result, signal B is gated through transistor Q5 and resistor R11 by this pulse train to produce a pulse train-gated signal C which will be a logic high only when signal B and the pulse train signal from I7 are coincidentally logic highs. Signal C is fed to monitoring circuit VII and comprises a series of signals of the first class.

Referring now to monitoring circuit IV, external power B+ is supplied to first terminals of resistors R12, R14, R16 and R18. The second terminals of resistors R12, R14, R16 and R18 are connected to first contacts of switches SW1, SW2, SW3, and SW4, respectively. Resistors R13, R15, R17 and R19 are connected between ground and second contacts of switches SW1, SW2, SW3, SW4, respectively. Connected to the connection of resistors R13, R15, R17 and R19 to switches SW1, SW2, SW3 and SW4, respectively, are input pin 2 of NAND gate NG10, input pin 5 of NAND gate NG11, input pin 9 of NAND gate NG12, and input pin 13 of NAND gate NG13, respectively, and, in power supply circuit V, input pin 14 of inverter I13, input pin 7 of inverter I14, input pin 3 of inverter I15, and input pin 5 of inverter I16, respectively. Switches SW1–SW4 represent the switches associated with respective seat belts and are opened when the respective seat belt is unfastened and closed when the respective seat belt is fastened. When the seat belts are unfastened, switches SW1–SW4 are open and the respective inputs to NAND gates NG10–NG13 and inverters I13 – I16 are grounded through resistors R13, R15, R17 and R19, respectively. When a respective seat belt is fastened, the respective switch is closed and a voltage division occurs between R12 and R13, R14 and R15, R16 and R17, and R18 and R19, respectively. The values of resistors R12–R19 are chosen such that the divided voltages appearing at the high side of R13, R15, R17, and R19 are logic highs. Consequently, when the seat belts are fastened, logic high voltages are applied to the input pins 14, 7, 3 and 5 of inverters I13–I16, respectively, and to the inputs pins 2, 5, 9 and 13 of NAND gates NG10–NG13, respectively. Hence, each of the NAND gates NG10–NG13 is enabled by the fastening of the associated seat belt, i.e., the closing of the associated switch SW1, SW2, SW3 or SW4. Timing signals Sample 1 – Sample 4 are fed to input pin 1 of NAND gate NG10, input pin 6 of NAND gate NG11, input pin 8 of NAND gate NG12, and input pin 12 of NAND gate NG13, respectively. NAND gate NG14 has its input pins 9, 10, 11 and 12 connected to the output pins 3, 4, 10 and 11, respectively, of NAND gates NG10–NG13. Consequently, NAND gates NG10–NG13, when enabled by the closing of seat belt switches SW1 – SW4, pass inverted timing signals Sample 1 – Sample 4 to the input pins 9–12 of NG14. Thus, if no seat belt is fastened, the outputs of NAND gates NG10–NG13 will be logic highs and the output of NG14 will be a logic low; and if one or more seat belts are fastened, a composite signal made up of one or more of the inverted timing signals Sample 1–Sample 4, depending on which belt or belts are fastened, will appear at the output of NG14. The output of NAND gate NG14, appearing at pin 13, is fed to power supply V through diode D2 and to monitoring circuit VII. The signal appearing at the output of monitor circuit IV is labelled A in FIG. 2.

Referring now to power supply V, the inputs to inverters I13–I16 are seat by the condition (open or closed) of associated switches SW1–SW4 as described hereinabove; the inverter outputs appear at output pins 15, 6, 2 and 4 and are applied to input pins 5, 4, 3 and 2, respectively, of NAND gate NG15. Hence, when all seat belts are unfastened, the inputs to inverters I13–I16 are all logic lows and the inputs to NAND gate NG15 are all logic highs causing the output voltage at pin 1 of NAND gate NG15 to be a logic low. If any seat belt is fastened, the output of NAND gate NG15 will be a logic high. The output of NAND gate NG15 is connected to the base of transistor TR6 through diode D3, in the polarity shown, and resistor R21. Also connected to the base of transistor TR6 and one terminal of R21 is the cathode of zener diode D5. The anode of zener diode D5 is grounded. The cathode of isolating diode D4 is connected to the cathode of the diode of D3 and to one terminal of resistor R21 while the anode of D4 is connected to the vehicle ignition/auxiliary power system IX. As described hereinabove, external power B+ is connected to the collector of transistor TR6 and power is not passed through to the emitter of transistor TR6 until TR6 is rendered conductive. When the base of transistor TR6 is at a logic low, TR6 is non-conductive. When the output of NG15 is a logic high passed through D3 and R21 to the base of TR6, or when a positive voltage is developed by actuation of the ignition/auxiliary power system IX and applied through D4 and R21 to break down zener diode D5, a logic high is applied to the base of TR6, which is rendered conductive to pass approximately B+ voltage to its emitter. Connected between the emitter of transistor TR6 and ground is filter capacitor C7. The signal appearing at one output of power supply V at the emitter of TR6 is labelled V+ in FIG. 2. When transistor TR6 is conductive, power supply output voltage V+ is developed and will approximately equal the external power supply voltage B+. When transistor TR6 is nonconductive, the power supply output voltage is essentially at ground potential. As a result, when any one or more of the seat belts are fastened, or if the ignition/auxiliary power system IX is activated, transistor TR6 will be rendered conductive and V+ will be developed; otherwise, TR6 will be non-conductive and the power supply output voltage will be at approximately ground potential. The output of power supply V is also applied through resistor R20 as signal A to monitoring circuits IV and VII and to delay circuit VI.

Figure 3:
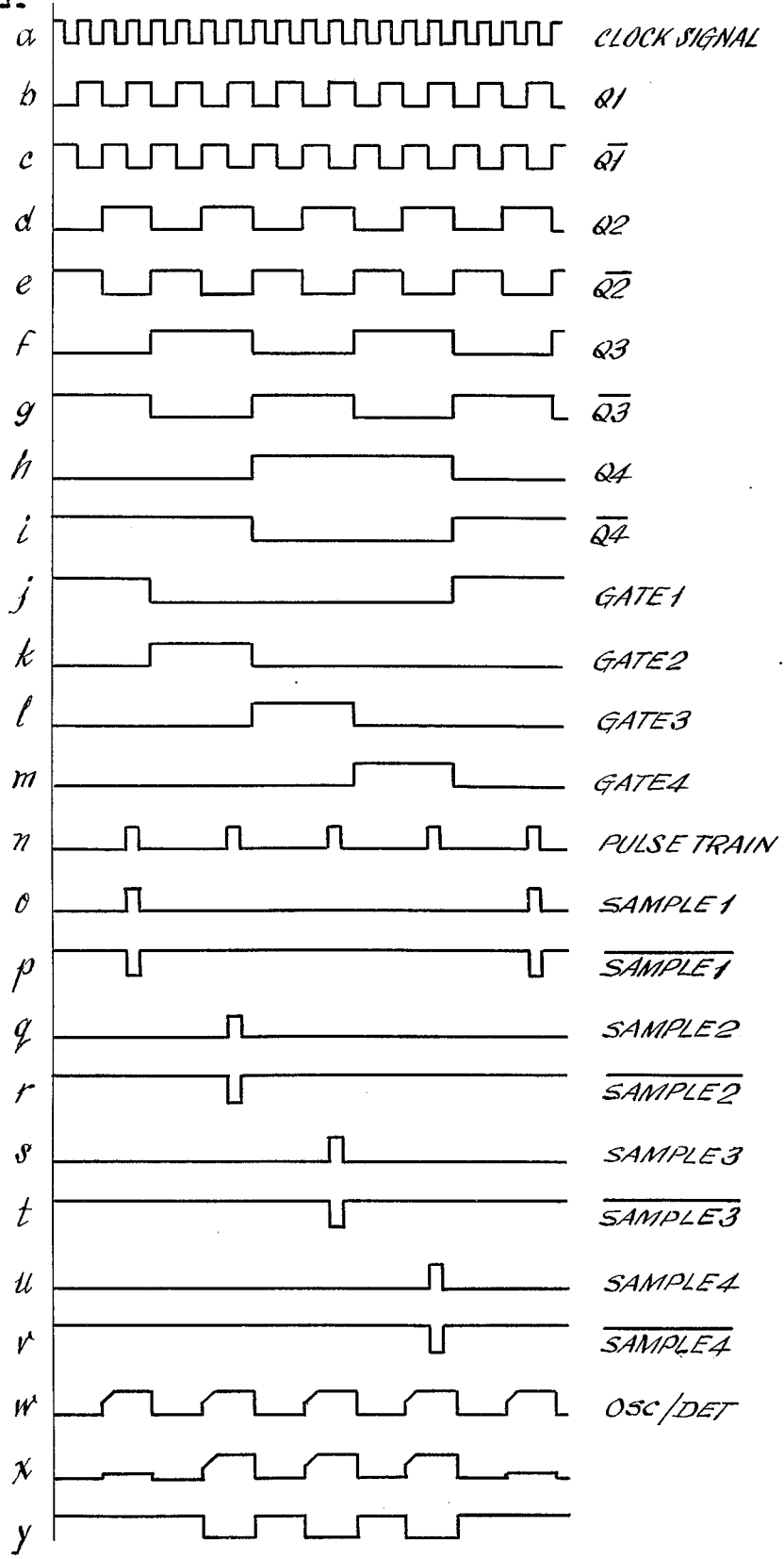
FIG. 3 is a timing diagram comprising a series of wave forms of various pertinent voltages developed within the electronic system of FIGS. 1–2, all having a common time base.

Referring now to delay circuit VI, the cathode of diode D7 is connected to the output of power supply V while its anode is connected to one terminal of capacitor C8 and to the cathode of diode D6. The other terminal of capacitor C8 is grounded and the anode of diode D6 is connected to signal A from power supply V. When signal A is a logic low, delay circuit VII has no effect on the system. Signal A will be a logic low when all the inputs of NAND gate NG14 in monitoring circuit IV are logic highs regardless of the conductivity of transistor TR6 in power supply circuit V. The conditions which permit signal A to become a logic high are a logic high output at output pin 13 of NAND gate NG14 in monitoring circuit IV, conductivity of transistor TR6 in power supply circuit V and completion of charging of capacitor C8 in delay circuit VI. Since capacitor C8 is uncharged when transistor TR6 is non-conductive, V+ is not developed by power supply circuit V. When the output of NAND gate NG14 becomes a logic high and transistor TR6 becomes conductive, signal A will be prevented from becoming a logic high until C8 has been charged. Hence, a delay is interposed in the system and manifested in the time period required for signal A to develop. Capacitor C8 becomes charged by the flow of current through transistor TR6, resistor R20 and diode D6 when the output of NAND gate NG14 is a logic high and diode D7 is back-biased, which occurs when transistor TR6 conducts, V+ exceeding the voltage magnitude of signal A due to the voltage drop in resistor R20. Capacitor C8 is discharged through D7, R20, D2 and NG14 when transistor TR6 becomes non-conductive. Since the output of NAND gate NG14 is a composite signal of Sample 1 – Sample 4, only becoming a logic high when any of NAND gates NG10–NG13 are enabled by associated switches SW1–SW4 to pass any one or more of timing signals Sample 1 –Sample 4, capacitor C8 is charged by successive pulses rather than by a continuous voltage. The total charging time of capacitor C8, therefore, depends not only on the RC time constant (the values of R20 and C8) but also the duty cycle of the timing signals Sample 1 – Sample 4, as shown in FIGS. 3 o, q, t and v.

Delayed signal A is fed to monitoring circuit VII, as is, also, logic signal C from detection circuit III. Hence, monitoring circuit VII processes signals of both first and second classes, i.e., signals indicating seat occupancy and signals indicating belt buckle and/or ignition/auxiliary power system condition. The signals A and C are both fed to processor circuitry made up of paired NAND gates NG16–NG17, NG18–NG19, NG20–NG21 and NG22–NG23, one pair for each seat station. Each pair is identical and it will, therefore, be necessary to describe only one pair — NAND gates NG16 and NG17. Because the entire system only becomes energized upon the fastening of one or more belt buckles or the energization of the ignition/auxiliary power system, the processor circuitry is prevented from detecting seat occupancy until the system is completely energized. In order to determine seat occupancy before considering buckle condition at the moment the system becomes completely energized, the processor circuitry is inhibited until seat occupancy is first determined. This is accomplished by means of the delay in signal A, as described hereinabove. If signal A fed to pin 11 of NG17 is a logic low, which it is prior to complete energization of the system and during the ensuing delay associated with charging capacitor C8, then NAND gate NG17 is inhibited regardless of the condition of signal C fed to input pin 1 of NG16 and timing signal Sample 1 fed to input pins 2 and 12 of NAND gates NG16 and NG17, respectively. Upon termination of the time delay associated with the charging of capacitor C8, NAND gate NG17 is no longer inhibited and NAND gate pair NG16–NG17 processes the seat occupancy and belt buckle information contained in signals C and A, respectively, in time registration with timing signal Sample 1. NAND gate NG25, at input pins 5, 4 3 and 2, receives the information from the respective NAND gate pairs and provides a logic high output at pin 1 when any of the processor circuitry signals E1–E4 are at a logic low. The input pins 1 and 2 of NAND gate NG26 are connected together and to the output pin 1 of NG25, thus acting as an inverter. Signal F represents the output of NG26 appearing at pin 3 as signal F is applied to input pin 13 of NAND gate NG27 which combines the information from the processor circuitry of monitor circuit VII and the information from detection circuit III via NAND gate NG24. Signal C is applied to input pin 3 of NAND gate NG24; the pulse train is applied to input pin 4 of NG24; and signal $\overline{A}$, which is the inversion of signal A produced by inverter I12, is applied to input pin 4 of NG24. The pulse train input insures processing of C and $\overline{A}$ by NG24 during the proper time interval. The output of NAND gate NG24 appearing at pin 6 is connected to NAND gate NG27 at input pin 12. The output of NAND gate NG27 at output pin 11 is fed to drive circuit VIII and is labelled signal G in FIG. 2.

Referring now to drive circuit VIII, it is made up of NAND gates NG28 and NG29, capacitor C9, resistor R22 and transistor TR7. The output of NAND gate NG28 appearing at pin 4 is connected to one terminal of capacitor C9. The other terminal of capacitor C9 is connected to one terminal of resistor R22 and to both input pins 8 and 9 of NAND gate NG29. The other terminal of resistor R22 is grounded. The output of NAND gate NG29 appearing at pin 10 is connected to input pin 5 of NAND gate NG28 and also to the base of transistor TR7. The output signal of NAND gate NG29 is labelled H in FIG. 2. The collector of transistor TR7 is grounded and the emitter is connected to a warning circuit and/or ignition control circuit. NAND gates NG28 and NG29 with capacitor C9 and resistor R22 are connected as a monostable or "one-shot" multivibrator. This multivibrator circuit is triggered by the leading edge of a negative-going pulse applied to input pin 6 of NAND gate NG28, and in response thereto provides a logic low at the output of NAND gate NG29 for a predetermined period of time determined by the values of capacitor C9 and resistor R22. Thus, when signal G is a constant logic low, or a constant logic high or changing from a logic low to a logic high, logic signal H remains a logic high. When signal G changes from a logic high to a logic low, signal H changes from a logic high to a logic low and remains a logic low for the predetermined period of time. When signal H is a logic high, TR7 is prevented from conducting since the voltage at the emitter of TR7 is less than the voltage of the logic high of H. When H is a logic low, transistor TR7 is rendered conductive. In the embodiment shown in FIGS. 1 and 2, when logic signal H is a logic low, an alarm condition is present. An alarm condition may be defined as an improper or imcomplete sequence of events involving seat occupancy, and belt fastening and/or ignition/auxiliary power system activation.

The operation of the complete system will most easily be explained by means of a description of events which constitute alarm and non-alarm situations and the conditions created in selected circuits as a result thereof. The only proper sequence of events occurs when a seat is occupied by a human followed by the fastening of the associated seat belt. A determination of seat occupancy and seat buckle condition is not made until one or more seat belts are fastened or the ignition/auxiliary power system is energized. In other words, after the system has been fully energized by a fastening of a seat belt or activation of the ignition/auxiliary power system, then the seat belt and seat occupancy information will be processed to determine a proper sequence. An alarm condition will not occur until at least one seat belt has been fastened or the ignition/auxiliary power system has been activated. An alarm condition will occur if the sequence of events is proper for one or more stations but improper for any other station, regardless of whether the improper sequence of events for any other station occurs prior or subsequent to the proper sequence of events for one or more stations.

Referring now to FIGS. 1–2, and the timing diagram in FIG. 3, a discussion of the conditions of selected portions of the system under the different seat occupancy, seat belt, and ignition/auxiliary power system conditions follows. For example, when all seats are unoccupied and all belts are unfastened and the ignition/auxiliary power system not energized, then there is a no-alarm condition, i.e., signal H is a logic high. Since no seat belts are fastened and the ignition/auxiliary power system is unactivated, transistor TR6 is not conducting and signal A is a logic low and v+ is not generated, i.e., the power supply V input is at ground potential. Consequently, detection circuit III is de-energized and signals B and C are logic lows. Since signal C is a logic low, signal D is a logic high (NG24). Since A is a logic low, signals E1–E4 are logic highs and signal F is a logic high (NG25, NG26). Since signals F and D are logic highs, signal G is a constant logic low (NG27). Consequently, the "one-shot" multivibrator is not triggered and signal H is a constant logic high, indicating a no-alarm condition. If one or more seats were then occupied by humans, there would be no change in signals B and C since TR6 is still non-conducting. Similarly, there would be no change in the outputs of power supply circuit V. Hence, signal H continues to be a logic high. When a seat belt is fastened corresponding to a seat which has been previously occupied by a human, for example, SW1, then a logic high is fed to the input of inverter I13 which feeds a logic low to input pin 5 of NG15 causing its output pin 1 to go to a logic high. This logic high output at NAND gate NG15 causes transistor TR6 to conduct and provide immediately the voltage V+ which energizes detection circuit III. As a result, the seat occupancy information is immediately ready for processing in the processor circuitry, but processing is inhibited since signal A applied to pin 11 of NG17 remains a logic low until the time delay associated with the charging of capacitor C8 runs out. During this delay period, signals E1–E4 remain logic highs causing signal F to remain a logic high. Since the seat incorporating antenna A1 is occupied, the tank circuit in detection circuit III is loaded as shown in FIG. 3x, and causes B to be a logic high during GATE 1 signal pulses as shown in FIG. 3y. Signal C is, therefore, identical to the timing signal Sample 1. Since A is a logic low during the delay, $\overline{A}$ is a logic high and NAND gate NG24 is enabled to combine signal C and the pulse train from I7. This combination reduces to adding Sample 1 and the pulse train and inverting the addition in NG24. Hence, signal D from NG24 is $\overline{Sample\ 1}$, i.e., the inversion of Sample 1. Since signal F is a logic high, NAND gate NG27 is enabled and passes and inverts the $\overline{Sample\ 1}$ signal, so that signal G from NG27 represents the original Sample 1 signal. Since signal G is cyclically changing from a logic high to a logic low, the one-shot multivibrator is repeatedly energized to cyclically force signal H to a logic low in accordance with the values of C9 and R22. Consequently, TR7 is rendered conductive and an alarm condition exists during the delay period. Once the delay period is over, the processor circuitry and NG24 in monitor circuit VII determine whether or not the sequence is proper by processing both seat occupancy and belt buckle condition information. When the delay is over, signal A is permitted to become a logic high as determined by the output of NAND gate NG14. The output of NG14 follows the Sample 1 timing signal which was passed and inverted by both NG10 and NG14. Hence, signal A is identical to Sample 1. As mentioned above, signal C is also identical to Sample 1, there being no change to detection circuit III after the delay period. Sample 1 thus appears at input pins 1 and 2 of NG16 and input pins 11 and 12 of NG17 with the net result being that the output E1 at pin 10 of NG17 of NAND gate pair NG16–NG17 is a constant logic high. NAND gate pairs NG18–19, NG20–21, and NG22–23, also have their outputs E2, E3 and E4, respectively, at logic highs because the logic high of Sample 1 applied to pin 8 of NG19, to pin 5 of NG21 and to pin 11 of NG23 is never in registration with the logic highs of Sample 2 applied to pin 1 of NG19, of Sample 3 applied to pin 4 of NG21, or of Sample 4 applied to pin 12 of NG23. The output of NAND gate NG25 is therefore a constant logic low and signal F is a constant logic high. Since the time delay in the appearance of signal A introduced by the charging of C8 does not affect the energization of detection circuit III by V+, signal C remains identical to Sample 1 after the expiration of the time delay. After the delay period, signal A is identical to Sample 1. Therefore, $\overline{A}$ is identical to $\overline{Sample\ 1}$. Sample 1, corresponding to signal C at pin 3 of NG24, and $\overline{Sample\ 1}$, corresponding to signal $\overline{A}$ at pin 5 of NG24, cancel each other's effect on NG24 so that the output signal D at pin 6 of NG24 is a constant logic high. Since signals F and D are both logic highs, the output of NG27 is a constant logic low which fails to energize the one-shot multivibrator in drive circuit VIII. Consequently, a no-alarm situation properly results.

However, for example, if the seat incorporating antenna A1 is occupied and the ignition/auxiliary power system IX is activated, then detection circuit III will be energized and signal C will be identical to Sample 1. Since no seat belt has been fastened, the output of NAND gate NG14 will be a constant logic low, thereby shunting signal A. Signals E1–E4 will then be constant logic highs, since NAND gates NG17, NG19, NG21 and NG23 have constant logic low inputs at pins 11, 2, 5 and 11, respectively. Signal F will then be at a logic high, thereby enabling NAND gate NG27. Since signal A is a logic low, $\overline{A}$ is a logic high and enables NG24 to add signal C and the pulse train from I7 and invert the result. The output of NG24, signal D, is then identical to $\overline{Sample\ 1}$, shown in FIG. 3p. Since NAND gate NG27 is enabled, it passes and inverts $\overline{Sample\ 1}$ so that signal G is identical to Sample 1. The change in logic level from a high to a low in Sample 1 energizes the one-shot multivibrator in drive circuit VIII, causing signal H to go low and transistor TR7 to conduct. Hence, an alarm condition exists and is responded to by the warning/disabling circuit. If, after this, a seat belt would be fastened, then the predetermined time delay associated with capacitor C8 would be initiated and the alarm condition would be eliminated after termination of the delay period when signal F at input pins 13 and 12 of NG27 is a logic high, as discussed hereinabove.

If a belt is fastened when there is no corresponding seat occupancy, then detection circuit III is energized; but since the tank circuit L1-C3-C4 is not loaded during the appropriate one of gate signals G1–G4, there will be no cancellation of the effect on NG24 of the signals appearing at input pins 3 and 5 of NG24, and an alarm condition will result.

If the ignition/auxiliary power system IX is activated without having seat occupancy and a corresponding belt fastened, again there will be no cancellation of the effect of the signals at pins 3 and 5 of NG24. Signal D will therefore not be constant, and the change in logic levels will be gated through NG27 to activate the one-shot multivibrator in drive circuit VIII to create an alarm condition.

Thus, it can be seen that once any seat belt is fastened or the ignition/auxiliary power system is activated, an alarm condition will result unless human occupancy of one or more seats has been followed by the fastening of the associated seat belt(s).

In the preferred embodiment of the invention shown in the drawing and described above, the values and/or characteristics of the various circuit components are set forth below:

| Resistances | | | Capacitances | | |
|---|---|---|---|---|---|
| R1 | — | 22 megohms | C1 | — | 20 picofarads |
| R2 | — | 100K ohms | C2 | — | .22 microfarads |
| R3 | — | 10K ohms | C3 | — | 150 picofarads |
| R4 | — | 330 ohms | C4 | — | 470 picofarads |
| R5 | — | 1K ohms | C5 | — | .001 microfarads |
| R6 | — | 5K ohms (max.) | C6 | — | .001 microfarads |
| R7 | — | 1K ohms | C7 | — | 160 microfarads |
| R8 | — | 15K ohms | C8 | — | 1.0 microfarads |
| R9 | — | 15K ohms | | | |
| R10 | — | 100 K ohms | Inductances | | |
| R11 | — | 100K ohms | | | |
| R12 | — | 10K ohms | L1 | — | 82 microhenries |
| R13 | — | 100K ohms | | | |
| R14 | — | 10K ohms | | | |
| R15 | — | 100K ohms | Transistors | | |
| R16 | — | 10K ohms | | | |
| R17 | — | 100K ohms | TR1 | — | 2N3567 |
| R18 | — | 10K ohms | TR2 | — | 2N5135 |
| R19 | — | 100K ohms | TR3 | — | 2N3569 |
| R20 | — | 3.3K ohms | TR4 | — | 2N3569 |
| R21 | — | 10K ohms | TR5 | — | 2N3569 |
| R22 | — | 1 megohm | TR6 | — | 2N3567 |
| | | | TR7 | — | 2N4838 |
| Diodes | | | Flip-Flops | | |
| D1 | — | 1N5060 | FF1 | — | RCA-CD4013AE |
| D2 | — | 1N5060 | FF2 | — | RCA-CD4013AE |
| D3 | — | 1N5060 | FF3 | — | RCA-CD4013AE |
| D4 | — | 1N5060 | FF4 | — | RCA-CD4013AE |
| D5 | — | 1N5060 | | | |
| D6 | — | 1N5060 | | | |
| D7 | — | 1N5060 | | | |
| NAND Gates | | | Gates | | |
| NG1, NG25 | | RCA-CD4012AE | G1, G2, G3, G4 | | RCA-CD4016AE |
| NG2, NG3, NG4, NG5 | | RCA-CD4011AE | | | |
| | | | Inverters | | |
| NG6, NG7, NG8, NG9 | | RCA-CD4011AE | L1, L2, L3, L4, L5, L6 | | RCA-CD4008AE |
| NG10, NG11, NG12, NG13 | | RCA-CD4011AE | L6, L7, L8, L9, L10, L11, L12 | | RCA-CD4009AE |
| NG14, NG15 | | RCA-CD4012AE | | | |
| NG16, NG17, NG18 | | RCA-CD4023AE | L13, L14, L15, L16 | | RCA-CD4009AE |
| NG19, NG20, NG21, NG22 | | RCA-CD4023AE | | | |
| NG23, NG24 | | RCA-CD4023AE | | | |
| NG26, NG27, NG28, NG29 | | RCA-CD4011AE | | | |

The advantages of the present invention, as well as certain changes and modifications of the disclosed embodiments thereof, will be readily apparent to those skilled in the art. For example, circuits other than delay circuit VI may be employed in the disclosed system to inhibit processing of information received from detection circuit III for a predetermined delay period. Similarly, the interstices of monitoring circuit IV, power supply circuit V, monitoring circuit VII and drive circuit VIII may be different from those shown, which are only for purposes of illustration. The processor circuitry in monitor circuit VII, in conjunction with delay circuit VI, may be used independently for applications in which it is desired to delay processing of information of two classes until after the expiration of a predetermined period of time. It is applicant's intention to cover all those changes and modifications which could be made to the embodiments of the invention herein chosen for the purposes of the disclosure without departing from the spirit and scope of the invention.

What is claimed is:

1. A multiplexed signal-sequence control system comprising:
  1. first circuit means operative, when fully energized, to generate a multiplexed output signal comprising a plurality of component signals each representative of the presence or absence of a signal of the first class; and
  2. second circuit means operative to receive a plurality of signals of the second class and, upon receiving a signal of the second class, further operative to fully energize said first circuit means and to process signals of the first and second classes in that order, and further operative to generate a control signal in response to (a) one or more signals of only the first class or only the second class, (b) unrelated signals of both the first and second classes, or (c) related signals of both the first and second classes occurring in an improper sequence.

2. The system according to claim 1 wherein said first circuit means comprises:
  1. timing circuit means operative to generate first and second pulse trains, a plurality of gate signals and a plurality of timing signals;
  2. gating circuit means comprising a plurality of gates each operative to sense a signal of the first class at an input terminal, and each further operative to pass said signal of the first class upon receiving one of said plurality of gate signals from said timing circuit means; and
  3. detection circuit means operative to receive said first and second pulse trains from said timing circuit means and a composite input signal formed by the signals of the first class passed through said gating circuit means, and further operative in response thereto to generate said multiplexed output signal comprising a plurality of component signals each representative of the presence or absence of a signal of the first class.

3. The system according to claim 2 wherein said timing circuit means comprises:
  1. high-frequency, square-wave generator means operative to generate a clock signal;
  2. a plurality of flip-flop circuits connected in series and each operative to generate complementary output signals of progressively decreasing frequency, said first pulse train being generated by one of said plurality of flip-flop circuits;
  3. first logic means operative to receive said clock signal from said high-frequency, square-wave generator means and the first outputs from said first and second flip-flop circuits, and further operative in response thereto to produce said second pulse train;
  4. second logic means operative to receive the first and second output signals from each of the third and fourth flip-flop circuits and, in response thereto, to generate said plurality of gate signals; and
  5. third logic means operative to receive said second pulse train from said first logic means and said plurality of gate signals from said second logic means, and further operative to generate said plurality of timing signals.

4. The system according to claim 3 wherein said first logic means comprises a NAND gate having first and second inputs connected to receive said clock signal from said high-frequency, square-wave generator means, having a third input connected to receive said first output of said first flip-flop circuit, and having a fourth input connected to receive said first output of said second flip-flop circuit, and an inverter having its input connected to the output of said NAND gate, said second pulse train being generated at the output of said inverter.

5. The system according to claim 3 wherein said second logic means comprises a plurality of series-connected NAND gate/inverter circuits.

6. The system according to claim 3 wherein said third logic means comprises a plurality of series-connected NAND gate/inverter circuits.

7. The system according to claim 5 wherein each of said plurality of gates forming said gating circuit means has a control terminal connected to the output of the associated NAND gate/inverter circuit of said second logic means, and the output terminals of said plurality of gates are connected through a common capacitance to said detection circuit means to provide said composite input signal thereto.

8. The system according to claim 2 wherein said detection circuit means comprises:
 1. buffer amplifier means operative to receive said first pulse train from said timing circuit means and to generate energizing pulses in response thereto;
 2. shock-excited oscillator means operative to receive said energizing pulses generated by said buffer amplifier means and the output of said gate means, and further operative to generate a high-frequency output during the null periods between the energizing pulses generated by said buffer amplifier means;
 3. detector means operative to detect the envelope of the high-frequency output of said shockexcited oscillator means; and
 4. gating means operative to receive said second pulse train from said timing circuit means and to pass the detected output of said detector means only when said detected output is coincident with a pulse in said second pulse train.

9. The system according to claim 8 wherein said shock-excited oscillator means is coupled through said gating circuit means to a plurality of antennae for detecting the presence or absence of one or more external impedances having a substantial capacitive and/or resistive component coupled to any of said antennae, in response to which said high frequency output generated by said shockexcited oscillator means is damped.

10. The system according to claim 1 wherein said second circuit means comprises:
 1. power supply circuit means operative to receive standby power from an external source of power and normally operative to maintain said first circuit means partially de-energized, and further operative upon actuation to generate a power signal and a power output which fully energizes said first circuit means;
 2. first monitor circuit means operative to receive a plurality of timing signals from said first circuit means and a plurality of signals of the second class and, in response to a signal of the second class, further operative to actuate said power supply circuit means to fully energize said first circuit means;
 3. second monitor circuit means operative to receive said plurality of timing signals from said first circuit means, said power signal from said power supply circuit means, said second pulse train from said first circuit means, and said multiplexed output signal comprising a plurality of component signals each representative of the presence or absence of a signal of the second class and, in response thereto, to generate an intermediate signal in response to (1) one or more signals of only the first class or only the second class, (2) unrelated signals of both the first and second classes, and (3) related signals of both the first and second classes occurring in an improper sequence;
 4. drive circuit means operative to receive said intermediate signal from said second monitor circuit means and, in response thereto, to generate said control signal; and
 5. delay circuit means operative to receive the power output from said power supply circuit means and to delay the generation of said power signal for a predetermined period of time after the generation of said power output by said power supply circuit means.

11. The system according to claim 10 wherein said power supply circuit means comprises a plurality of inverters each having its input coupled to said first monitor circuit means to receive an associated one of said plurality of signals of the second class, and each having its output connected to an associated input terminal of a NAND gate, the output of said NAND gate being coupled to power switching means connected to said external source of power and operative in response to a logic high output from said NAND gate to generate said power output and said power signal.

12. The system according to claim 11 wherein said power switching means comprises a transistor having its collector connected to said external source of power, its emitter connected through a filter capacitance to ground, and its base connected to a voltage regulation circuit comprising a resistance and a zener diode connected in series between the output of said NAND gate and ground, said power output being developed at the emitter of said transistor, and said power signal being developed through a resistance connected between said emitter of said transistor and said first and second monitor circuit means and said delay circuit means.

13. The system according to claim 11 wherein said first monitor circuit means comprises a plurality of voltage divider means each including a pair of resistors connected from said external source of power through a switch at the junction of said pair of resistors to ground, said switch being normally open and having its low terminal connected to an associated one of a plurality of NAND gates and to an associated one of a plurality of said inverters in said power supply circuit means, each of said plurality of NAND gates also being operative to receive said plurality of timing signals from said first circuit means, the outputs of said plurality of NAND gates being connected to the associated input terminals of a NAND gate having its output terminal connected to control said power signal by either not shunting or by intermittently shunting said power signal.

14. The system according to claim 10 wherein said second monitor circuit means comprises:
1. a plurality of NAND gate pairs operative to receive said plurality of timing signals from said timing circuit means, said power signal from said power supply circuit means and said multiplexed otuput signal from said first circuit means, and operative in response thereto to generate a plurality of intermediate signals each of which is indicative of the occurrence of (1) one or more signals of only the first class or only the second class, (2) unrelated signals of both the first and second classes, and (3) related signals of both the first and second classes occurring in an improper sequence;
2. a NAND gate having its inputs connected to receive said plurality of intermediate signals from said plurality of NAND gate pairs;
3. inverter means operative to receive the output of said NAND gate;
4. an output NAND gate operative to receive the output of said inverter means as a first input;
5. power signal inverter means operative to receive said power signal from said power supply circuit means; and
6. an input NAND gate operative to receive said multiplexed output signal from said first circuit means, said second pulse train from said first circuit means, and the output of said power signal inverter, and to provide a second input to said output NAND gate.

15. The system according to claim 14 wherein each of said NAND gate pairs comprises first and second NAND gates, said first NAND gate having its output connected to a first input of said second NAND gate, the second input of said second NAND gate being connected to a first input of said first NAND gate, each of which receives an associated one of a plurality of said timing signals from said first circuit means, and said third input of said second NAND gate is connected to receive said power signal, the second input of said first NAND gate being connected to receive said multiplexed output signal from said first circuit means, and the third input of said first NAND gate being connected to the output of said second NAND gate, said intermediate signal being generated at the output of said second NAND gate.

16. The system according to claim 10 wherein said drive circuit means comprises:
1. a monostable multivibrator normally operative to provide a high output, and operative in response to a negative going intermediate signal from said second monitor circuit means to generate a low output for a predetermined period of time; and
2. transistor means operative to receive the output of said monostable multivibrator and to change the energization state of an external circuit in response to a change in the output of said monostable multivibrator.

17. The system according to claim 16 wherein said monostable multivibrator comprises:
1. a NAND gate having a first input terminal connected to receive said intermediate output from said second monitor circuit means;
2. a capacitance and a resistance connected in series from the output of said NAND gate to ground; and
3. inverter means having its input connected to the junction of said capacitance and resistance and having its output connected to a second input of said NAND gate, said control signal being developed at the output of said inverter means.

18. The system according to claim 16 wherein said transistor is maintained normally non-conductive by a high output from said monostable multivibrator, and said transistor is rendered conductive in response to a low output from said monostable multivibrator, which low output constitutes said control signal.

19. The system according to claim 12 wherein said delay circuit means comprises first and second diodes connected in series, with the anode of said first diode being connected to receive the power output of said power supply circuit means and the cathode of said second diode being connected to receive the power signal of said power supply circuit means, and a timing capacitance connected from the junction of the cathode of said first diode and the anode of said second diode to ground, said resistance connected from the emitter of said transistor in said power switching means and said timing capacitance forming an RC charging circuit operative to delay the development of said power signal for a predetermined period of time after the generation of said power output by said power supply circuit means.

20. In a vehicle having a plurality of seating stations, a plurality of seating belts each associated with one of said seating stations, an ignition/auxiliary power circuit, and a warning/disabling circuit, the improvement comprising:
normally partially de-energized mutliplexed signal-sequence control means operative to receive a plurality of signals of the first class indicating seat belt usage, and further operative to become fully energized either upon receiving a signal of the second class or upon actuation of the ignition/auxiliary power circuit, and operative when fully energized to actuate the warning/disabling circuit in response to (1) one or both signals of only a first class or of only a second class, (2) unrelated signals of both the first and second classes, or (3) related signals of both the first and second classes occurring in an improper sequence.

* * * * *

UNITED STATES PATENT OFFICE
CERTIFICATE OF CORRECTION

PATENT NO. : 3,935,470
DATED : January 27, 1976
INVENTOR(S) : Arthur F. Cake

It is certified that error appears in the above-identified patent and that said Letters Patent are hereby corrected as shown below:

Col. 2, Line 10: "(1)" after "either" has been omitted

Col. 5, Line 37: "Sample 1 - Sample 4" should read

--$\overline{\text{SAMPLE 1}}$ - $\overline{\text{SAMPLE 4}}$--

Col. 5, Line 43: "Sample 1 - Sample 4" should read

--$\overline{\text{SAMPLE 1}}$ - $\overline{\text{SAMPLE 4}}$--

Col. 5, Line 50: "seat" should read --determined--

Col. 5, Lines 55-56: "I1" and "3" should read --I13--

Col. 8, Line 62: "v+" should read --V+--

Col. 9, Line 29: "A" (second occurrence) should read --$\overline{A}$--

Col. 15, Line 6: (Claim 14): "otuput" should read --output--

Col. 16, Line 39: (Claim 20): "seating belts" should read --seat belts--

Signed and Sealed this first Day of June 1976

[SEAL]

Attest:

RUTH C. MASON
Attesting Officer

C. MARSHALL DANN
Commissioner of Patents and Trademarks